(12) United States Patent
Duwendag et al.

(10) Patent No.: US 8,695,531 B2
(45) Date of Patent: Apr. 15, 2014

(54) BACKING RUN FOR NOZZLE PASTE APPLICATION

(75) Inventors: Ruediger Duwendag, Lengerich (DE); Marco Daher, Wallenhorst (DE); Thomas Knoke, Bielefeld (DE); Andreas Lamkemeyer, Osnabrueck (DE)

(73) Assignee: Windmoeller & Hoelscher KG, Lengerich (DE)

( * ) Notice: Subject to any disclaimer, the term of this patent is extended or adjusted under 35 U.S.C. 154(b) by 398 days.

(21) Appl. No.: 12/734,897

(22) PCT Filed: Nov. 26, 2008

(86) PCT No.: PCT/EP2008/066260
§ 371 (c)(1),
(2), (4) Date: Aug. 16, 2010

(87) PCT Pub. No.: WO2009/068572
PCT Pub. Date: Jun. 4, 2009

(65) Prior Publication Data
US 2010/0304032 A1 Dec. 2, 2010

(30) Foreign Application Priority Data
Nov. 30, 2007 (DE) .......................... 10 2007 057 820

(51) Int. Cl.
*B05C 5/02* (2006.01)
(52) U.S. Cl.
CPC ................. *B05C 5/0208* (2013.01); *B09J 5/02* (2013.01); *B32B 19/62* (2013.01)
USPC ............ 118/407; 118/410; 156/578; 493/264
(58) Field of Classification Search
USPC ........ 118/407, 410; 156/578; 427/207.1, 356; 53/383.1; 493/264; 383/52; 198/497, 198/781.04; 193/37
See application file for complete search history.

(56) References Cited

U.S. PATENT DOCUMENTS

| 3,448,666 | A | 6/1969 | Kappelhoff et al. | |
| 5,548,388 | A * | 8/1996 | Schieck | 399/381 |
| 5,716,313 | A * | 2/1998 | Sigrist et al. | 493/438 |
| 5,732,533 | A | 3/1998 | Focke et al. | |
| 6,475,283 | B1 * | 11/2002 | Koehn | 118/684 |
| 6,740,161 | B2 * | 5/2004 | Heide | 118/253 |

FOREIGN PATENT DOCUMENTS

| DE | 710 264 C | 9/1941 |
| DE | 746 334 C | 6/1944 |
| DE | 30 20 043 A1 | 12/1981 |
| DE | 90 14 598 U1 | 1/1991 |
| DE | 195 35 649 A1 | 3/1997 |
| DE | 196 39 260 A1 | 3/1998 |
| DE | 103 09 893 A1 | 4/2004 |
| DE | 103 03 285 A1 | 8/2004 |
| EP | 1 539 374 | 6/2005 |
| WO | WO 2004/030829 A1 | 4/2004 |

* cited by examiner

*Primary Examiner* — Laura Edwards
(74) *Attorney, Agent, or Firm* — Jacobson Holman PLLC

(57) ABSTRACT

A bottomer for the production of sacks, preferably cross-bottom valve sacks, includes at least one glue unit that applies glue to the components of the sacks. The glue unit includes a nozzle bar, which has at least one nozzle for extruding glue onto the sack components. The glue unit also includes a counter support, which positions the sack components with a force against the nozzle bar.

21 Claims, 4 Drawing Sheets

BACKING RUN FOR NOZZLE PASTE APPLICATION

CROSS-REFERENCE TO RELATED APPLICATIONS

This is a national stage of PCT/EP08/066,260 filed Nov. 26, 2008 and published in German, which has a priority of German no. 10 2007 057 820.4 filed Nov. 30, 2007, hereby incorporated by reference.

BACKGROUND OF THE INVENTION

1. Field of Invention

The invention relates to a bottomer for the production of sacks, a glue unit for applying glue to flat objects, and a method for the production of sacks.

2. Description of the Prior Art

Bottomers have been disclosed in the prior art. In particular, the production of cross-bottom valve sacks, which have been known for a long time, is the object of numerous published prior-art documents (e.g., DE 710 264 or DE 746 334) and is carried out using so-called bottomers or bottoming machines.

Also the application of glue to components of the sacks during production has been known for a long time from the published prior art (e.g., DE 090 145 48 U1 and DE 30 200 43 A1).

Traditional glue units use rollers, which usually support a plate in order to apply glue to the sack components. In cross bottomers, glue is often applied to the folded bottoms of the sacks, cap strips and valve patches assigned to the bottoms.

Devices have been disclosed in the recent past, which apply glue to sack components with the aid of nozzles. These nozzles are attached to a nozzle head or a nozzle bar or inserted into the latter in the form of bores. DE 103 09 893 A1 discloses a device of such type.

Devices of the aforementioned type offer a number of advantages. Thus, the plurality of different plates required to be kept ready for the production of different sack formats is rendered redundant.

However, there continues to be a need for improvement when it comes to ensuring a uniform and continuous application of glue to the sack components.

SUMMARY OF THE INVENTION

It is therefore the object of the present invention to suggest a device and a method by means of which the glue application is more uniform and more continuous.

The present invention is therefore based on the teaching of DE 103 09 893 A1 and achieves the object by adding the inventive features described herein.

It has been observed that a counter support, which positions the sack components with a force against the nozzle bar, results in the starch glue commonly used in the production of sacks being entrained or stripped off uniformly from the sack components when the sack component in question moves past the nozzle bar at a relative speed.

This holds true particularly in the application of cold glue.

This movement (at the relative speed mentioned above) is usually a movement of the sack components past a stationary nozzle bar, as already suggested in the document DE 103 09 893 A1 cited above. The nozzle bar in question can have or support any number of nozzles. The presence of more than two nozzles is of particular interest here. However, embodiments having more than five nozzles are also advantageous. More than ten nozzles are used advantageously in connection with the application of glue to cross-bottoms. In bottomers, such glue units of a new design can be used to apply glue to folded bottoms of sacks and/or bottom cap strips and/or valve patches.

It should be mentioned that a person skilled in the art usually differentiates between bags and sacks. However, the term "sacks" is intended to mean bags and/or sacks in the present wording of the claims.

As already mentioned above, the sack components are positioned by a counter support with a force against the nozzles. In doing so, it is advantageous if the counter support is made, at least partly, of flexible material. The flexibility of the counter-support material ensures that the sack-component surface requiring glue application, which sack components are made of several layers of material of various sizes and overlaps, is pressed against the nozzle bar. In addition to or instead of the flexibility, which at least ensures that the sack components are not crushed by an extremely rigid counter support, springy elements can also be inserted into the counter support. In addition to the softness of the flexible parts, the springy elements apply more restoring force. The elastic materials used can be elastomers. Spring steel sheets are cited as an example of springy materials.

It is advantageous
if the counter support comprises an active surface, and
if force can be applied with the aid of this active surface to at least one part of the rear side of the sack-component surface requiring glue application while the sack component is passing through the glue unit.

With the aid of such an active surface, the force required for positioning the sack components can be transmitted uniformly and optionally extensively to the sack components. The transmission of force to the rear side of the surface requiring glue application offers additional advantages.

It has proved to be advantageous to provide the active surface with a segmented design. This is particularly advantageous if the surfaces requiring glue application have varying thickness. This can result from different numbers of paper or foil layers. In this context, the term "segmented" means that the active surface is divided into partial areas. The partial areas can transmit force independently of each other to the rear side of the sack components. These partial areas can therefore also be moved independently of each other.

These partial areas can be circular, rectangular or oval and can virtually act as punches against the rear side of the sack components. The length of the partial areas (extension in the direction of movement of the sack components relative to the nozzle bar) can be proportionate to the width (extension transverse to the transfer direction). Ratios of width to length that are greater than 1:4 are advantageous.

The use of belts, whose surface components oriented toward the sack components form the active surface, is particularly advantageous. This is due to the elasticity of the belts, among other things. The segmentation of the active surface composed of several stretched belts results automatically when using a plurality of belts. The belts are usually stretched parallel to each other. It has proved to be advantageous if the belts are oriented along the direction of the relative movement of the sack components in the glue unit. In most cases, the nozzle bar extends transversely to the transfer direction of the sack components. In this case, approximately punctiform regions result, in which the belt deflected by the force action of the nozzle bar in the direction of the active surface presses the rear side of the sack components with a force.

It is also advantageous if the belts are not supported by a roller in this immediate area of influence of the nozzle bar. The use of various elastic belts at this location is possible. The belts can also be hinged to the counter support such that the former can move. A movability with the same orientation and optionally the same algebraic sign as the relative movement between the sack components and the nozzle bar is also of advantage here. The term "movability" in the aforementioned sense means that the belts and the active surface defined by them are movable relative to the machine frame. Usually, such a movability is brought about by guiding such belts over guide rollers. Endless belts are advantageous in this connection. It is possible to set the movable belts in motion by means of the movement of the sack components relative to the glue unit. The sack components are usually guided through the machine with the aid of other transport means such as conveyor belts (could also be grippers or the like), and driving forces could thus be transmitted to the belts of the counter support in question.

However, in this case, the sack components in question would be exposed to defined transmitted forces (particularly disadvantageous shearing forces).

It is therefore advantageous to drive the belts, with the drive device being preferably aligned with the direction and/or speed of the transport movement of the sacks in the glue unit.

It is advantageous to hinge the counter support and/or the nozzle bar to the machine frame in such a way that the entry angle of the sack components to the nozzle bar can be changed. Usually, the active surface is deviated relative to the machine frame for this purpose; that is, the components supporting or defining the active surface are hinged to the machine frame such that they can pivot. Summing up, it should be mentioned that the term "pivotability" is to be understood to mean the movability of the counter support, which movability changes the entry angle of the sack components into the gap between the counter support and the nozzle bar. In any case, the provision of such a pivotability of the position of the counter support relative to the nozzle bar is advantageous. Alternately and additionally, a linear movability of the counter support relative to the nozzle head is advantageous. This can be achieved by means of a movability of the nozzle head relative to the machine frame. However, here too, an additional linear movability of the counter support relative to the nozzle bar is alternately and additionally of advantage.

The contact pressure of the sack components can thus be adjusted with the aid of this movability, and it is possible, inter alia, to address the varying thickness of the sack components.

An additional advantageous embodiment of the invention has holding means, which transmit a holding force to the sack components. This holding force is advantageously transmitted to that side of the sack components to which glue is applied in the corresponding glue unit. A clamping effect can thus be achieved when the force of the counter support acting in the direction of the nozzle bar and the force of the holding means counteract each other. It is advantageous if the holding force acts on discrete closed surface regions of the sack components. These can be at a distance from each other in the spatial direction (x) extending transversely to the relative movement of the sack components. In the latter case, an adjustability of this distance is of advantage. The holding means can be designed as grippers, punches or also guide belts.

Additional exemplary embodiments of the invention will become apparent from the following description and the claims.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
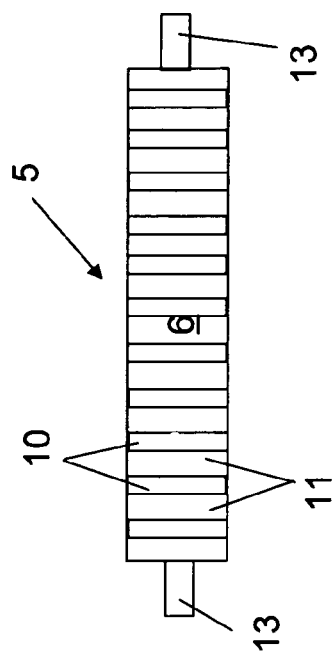
FIG. 1 is a sketch of a first exemplary embodiment of a glue unit of the invention

FIG. 1 shows a sketch of a first exemplary embodiment of a glue unit 1 of the invention, to which sack components 2 are supplied in the transfer direction z. A significant component of the glue unit 1 is the application head 3 comprising the nozzle bar 4, which mechanically counteracts the counter support 5. The counter support 5 is designed as a rotating roller, whose active surface 6 that is in contact with the rear side 7 of the sack component 2 and that transmits to the latter 2 the force required for being positioned against the nozzle bar is wiped off during each revolution of the counter support 5 by the doctor-blade device 8 comprising the doctor blade 9.

Figure 2:
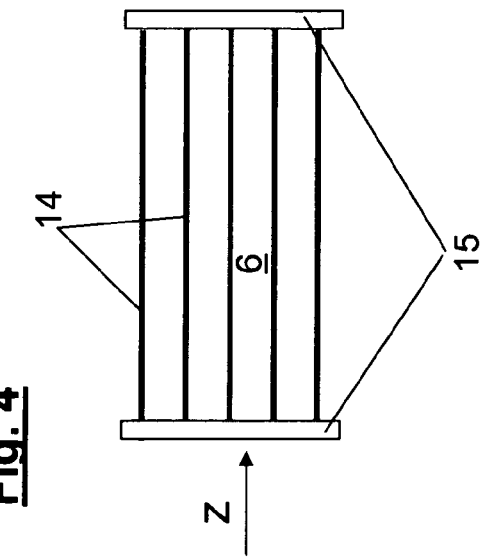
FIG. 2 is a view of the counter support (roller) shown in FIG. 1

FIG. 2 shows another view of the counter support 5 shown in FIG. 1, which shows that the active surface 6 is divided by means of slots 10 into surface segments 11. This division enables better positioning of the sack components having surfaces that are structured and have a characteristic topography with significant differences in height.

The counter support 5 designed as a roller has pins 13, on which it 5 can be mounted.

Figure 3:
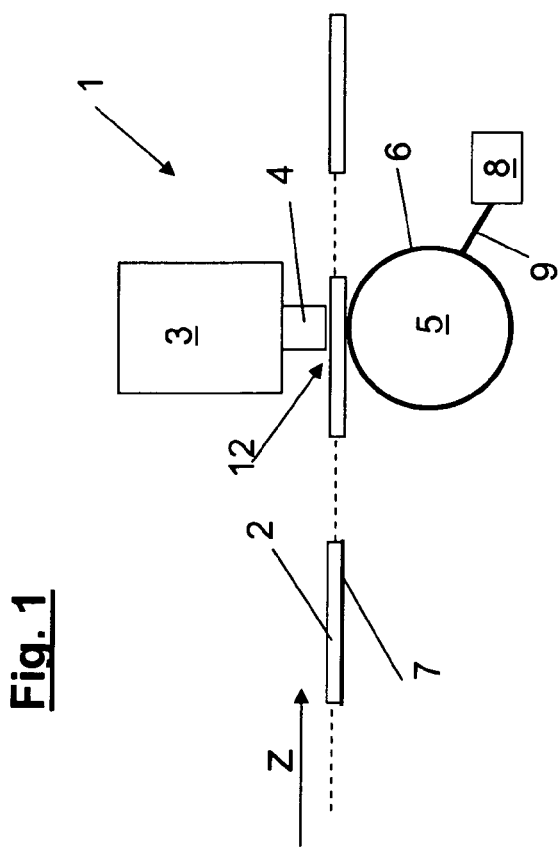
FIG. 3 is a sketch of a second exemplary embodiment of a glue unit of the invention

FIG. 3 shows another exemplary embodiment of a glue unit of the invention, which likewise comprises an application head 3 comprising a nozzle bar 4, with the aid of which glue can be applied to the sack components 2. The angle α is the angle, in which the sack components enter into the glue-application gap 12 formed by the nozzle bar 4 and the counter support 5. The counter support 5 is represented in a conventional form in FIG. 3 and can be implemented in the form shown in FIGS. 4, 5, 6 and 11.

Figure 4:
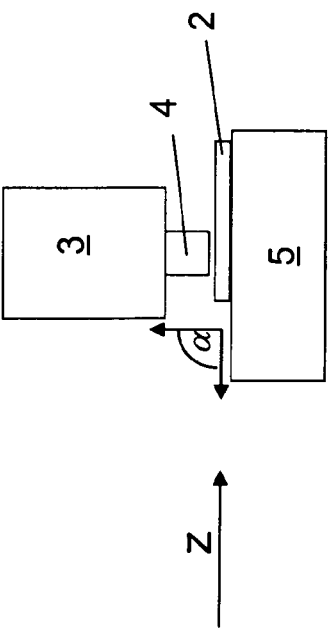
FIG. 4 is a top view of the active surface of the counter support of the glue unit shown in FIG. 3

In FIG. 4, the belts 14 are the elements defining the active surface 6 of the counter support 5. Those surface components of the belts 14 that come into contact with the sack components 2 when the latter are guided over the belts 14 form the active surface 6 in this case. The belts can be guitar strings that are oriented largely parallel to each other as shown in FIG. 4 and are under a defined (low) mechanical stress. The guitar strings or belts 14 are hinged to the legs 15. In this embodiment, it is also advantageous to align the belts along the direction of travel of the sack components.

The active surface 6 formed by the belts 14 is already segmented since the belts are at a distance from each other.

Figure 6:
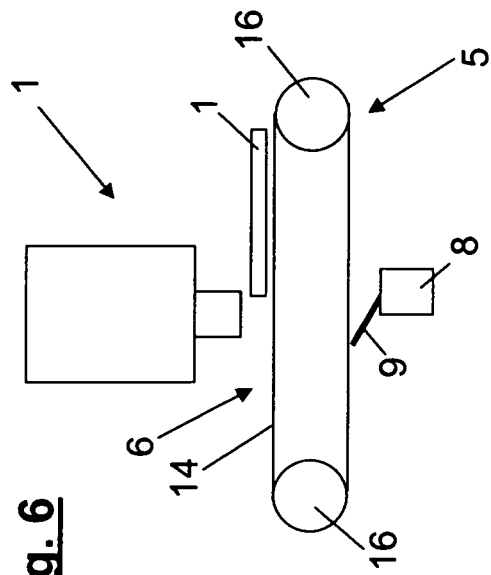
FIG. 6 is a sketch of a third exemplary embodiment of a glue unit of the invention

FIG. 6 shows another glue unit comprising another counter support 5, which in turn comprises belts 14, whose surface components touching the sack components 2 form the active surface 6. Unlike the exemplary embodiment shown in FIG. 4, the belts are guided by guide rollers 16 and moved in the transfer direction z of the sack components 2. The belts guided in such a way are again wiped off by the doctor-blade device 8 comprising the doctor blade 9.

Figure 5:
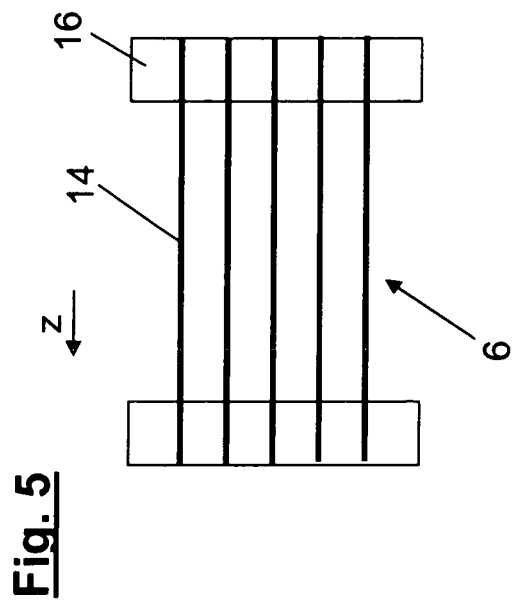
FIG. 5 is a top view of an active surface of the counter support of an additional glue unit shown in FIG. 6

FIG. 5 shows the active surface 6 from the point of view of the application head 3, which active surface is formed by the belts 14 running on the guide rollers 16.

Figure 7:
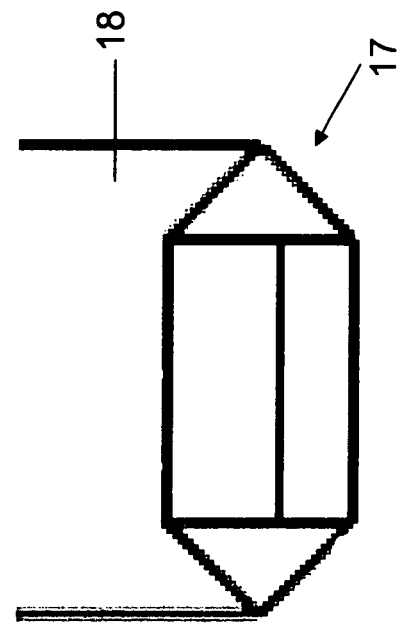
FIG. 7 shows the bottom of a cross-bottom valve sack

FIG. 7 shows the bottom 17 of a cross-bottom valve sack 18. The illustration is intended to clarify that the folding and material edges of such a sack bottom have differences in height. In view of these differences in height, the application of the counter supports 5 illustrated is of particular advantage here.

Figure 8:
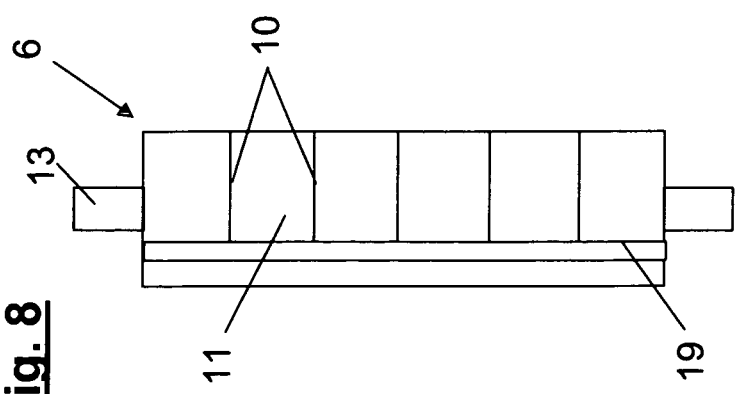
FIG. 8 shows the counter support of a glue unit for patches

FIG. 8 shows a counter support 5 that is substantially made of one roller. This roller has a segmented active surface 6 that is divided by means of slots 10 into surface segments 11. The surface segments are made of an elastic material that covers the circumferential surface of the roller serving as the counter support 5.

Figure 10:
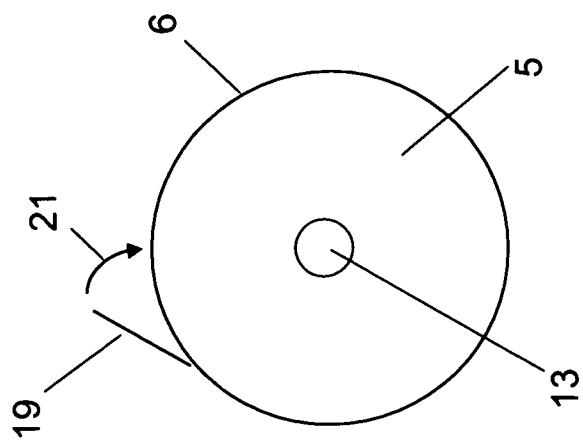
FIG. 10 is another view of the counter support shown in FIG. 8
Figure 9:
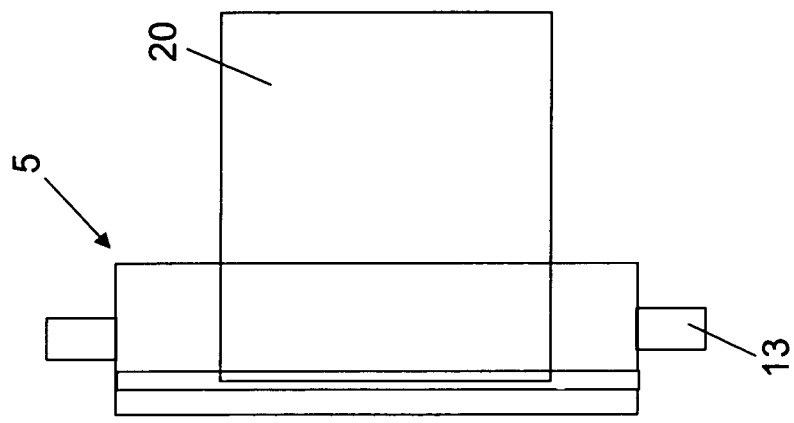
FIG. 9 shows the counter support shown in FIG. 8 during the transport of a patch

The roller comprises a clamping strip 19 that can fix a sack component—particularly, a patch—on the roller surface. The possible clamping movement of the clamping strip 19 is denoted by the arrow 21 in FIG. 10. FIG. 9 shows the manner in which a patch 20 is transported on the active surface 6 of the counter support 5.

Figure 11:
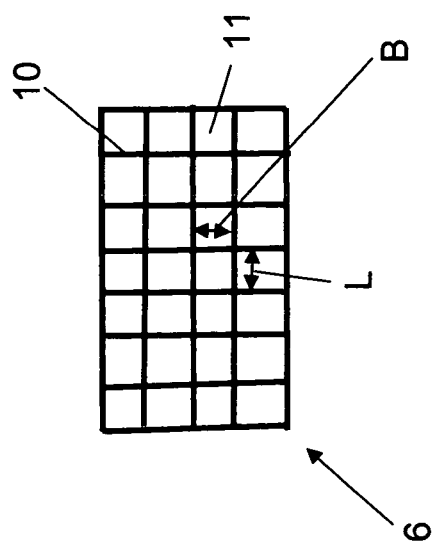
FIG. 11 is a top view of the counter support of an additional glue unit

FIG. 11 shows, from the point of view of the nozzle head 3, an additional active surface 6 comprising surface segments 11 delimited by the slots 10. The surface segments 11 oriented toward the sack components 2 are flexible. The surface segments themselves are positioned against the sack component by spring elements disposed on that side of the surface segments that is oriented away from the sack components. A point-elastic positioning of the sack components against the nozzle bar 4 is also achieved in this way. In reference to the different active surfaces 6 composed of surface components of belts 14, it must be mentioned that the point elasticity comes into being particularly when the belts 14 are oriented transversely to a linear nozzle bar 4.

Figure 12:
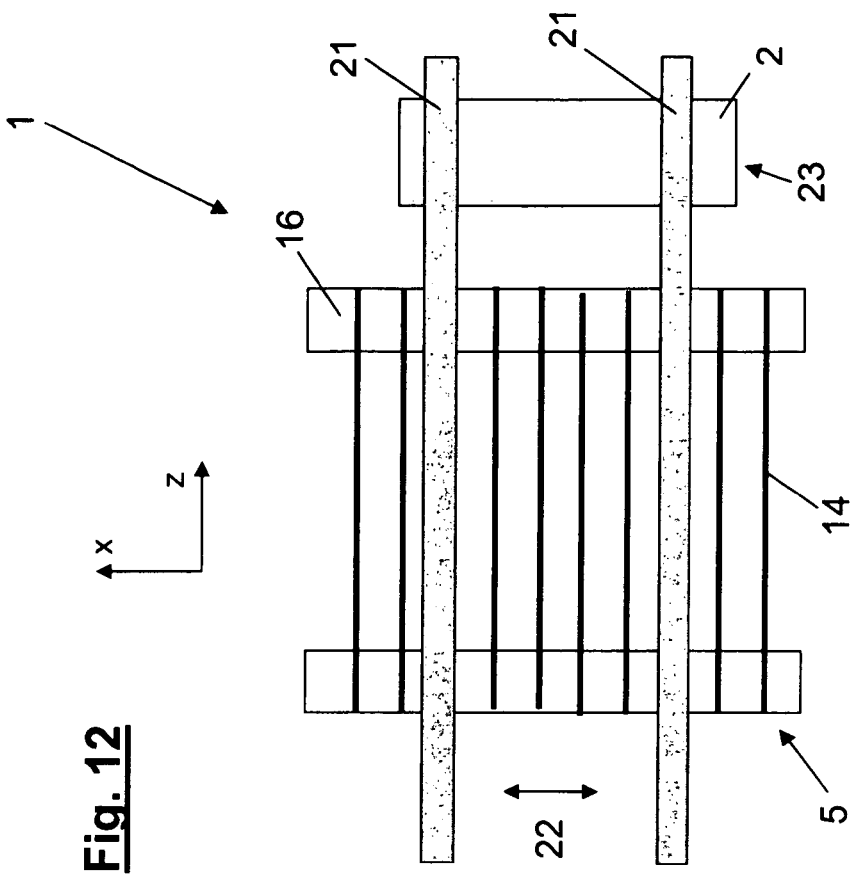
FIG. 12 is a top view of the counter support of an additional glue unit

FIG. 12 suggests another possibility of guiding the sack components 2 in a glue unit 1. To begin with, a counter support 5 largely corresponding to the counter support 5 shown in FIGS. 5 and 6 is illustrated from the point of view of the application head 3. Furthermore, the belts 21 are shown that are located in front of the belts 14 of the counter support from the point of view of the nozzle head. During transportation through the glue unit 1, the sack components 2 are fixed between the belts 14 and 21. Both types of belts are movable in the transfer direction so that the sack components are entrained between the largely synchronized belts. The belts 21 are shiftable in terms of their position in the direction x extending transversely to the transfer direction z of the sack components 1. This shiftability is ensured with the aid of measures that constitute standard practice such as shiftable suspension means of the rollers guiding the belts.

It is advantageous to adjust the distance of the belts 21 from each other such that the belts grasp the transported sack components in their end regions in the x direction.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| List of reference signs | |
|---|---|
| 1 | First glue unit |
| 2 | Sack components |
| 3 | Application head |
| 4 | Nozzle bar |
| 5 | Counter support |
| 6 | Active surface of the counter support 5 |
| 7 | Rear side of the sack components 2 |
| 8 | Doctor-blade device |
| 9 | Doctor blade |
| 10 | Slots |
| 11 | Surface segments |
| 12 | Glue-application gap |
| 13 | Pin of the counter support 5 |
| 14 | Belts of the counter support 5 |
| 15 | Legs to which the belts 14 are hinged |
| 16 | Guide rollers |
| 17 | Sack bottom |
| 18 | Cross-bottom valve sack |
| 19 | Clamping strip |
| 20 | Patch |
| 21 | Belts |
| 22 | Arrow |
| 23 | End region in x-direction |
| L | Length of the surface segment 11 |
| B | Width of the surface segment 11 |
| z | Transfer direction of the sack component 2 |
| x | Direction extending transversely to the transfer direction z |
| α | Entry angle |

What is claimed is:

1. A bottomer for the production of sacks, comprising:
at least one glue unit that applies a glue to components of the sacks,
the glue unit including a nozzle bar having at least one nozzle for extruding glue onto the sack components, and
a counter support that positions the sack components with a force against the nozzle bar, the counter support including a segmented active surface that applies force to at least one part of a rear side of the sack component surface to which the glue is being applied, the segmented active surface including partial areas that can transmit the force independently of each other.

2. The bottomer according to claim 1, wherein the counter support includes at least one of a flexible and a springy material.

3. The bottomer according to claim 1, wherein the segmented active surface includes segments having a width (B) and a length (L) in a plane of the segmented active surface, with the width and the length being at least in an aspect ratio of 1:4.

4. The bottomer according to claim 1, wherein the segmented active surface is configured as belts.

5. The bottomer according to claim 4, wherein the belts have a material of construction that includes at least one of a flexible plastic, wires, and polymer fibers.

6. The bottomer according to claim 5, wherein the plastic is an elastomer.

7. The bottomer according to claim 5, wherein the wires have a guitar string-like construction.

8. The bottomer according to claim 4, wherein the belts are oriented in a same direction as that of a relative movement between the nozzle bar and the sack components.

9. The bottomer according to claim 4, wherein the belts are movable in a same direction as a relative movement between the sack components and the nozzle bar is oriented.

10. The bottomer according to claim 4, further comprising at least one belt-guide roller, which brings about movement of the belts.

11. The bottomer according to claim 4, wherein the belts are movable and operatively interact with a drive with which the belts are moved.

12. The bottomer according to claim 1, wherein at least parts of the segmented active surface can be stripped off with a doctor-blade device.

13. The bottomer according to claim 12, wherein the segmented active surface is movable and the doctor-blade device is stationary.

14. The bottomer according to claim 1, wherein at least parts of the segmented active surface are attached so as to be movable relative to the nozzle bar.

15. The bottomer according to claim 14, further comprising pivotable device components which guide the belts or to which the belts are attached.

16. The bottomer according to claim 1, further comprising a holding element for applying a holding force to a side of the sack components to which the glue is to be applied in the glue unit, and for transmitting the holding force to the sack components inside the glue unit.

17. The bottomer according to claim 16, wherein the holding force can be applied with the aid of the holding element to holding surfaces of the sack components that are at a distance from each other in a direction (x) extending transversely to a relative movement (z) between the sack components and the nozzle bar.

18. The bottomer according to claim 17, wherein the distance between the holding surfaces is adjustable.

19. The bottomer according to claim 17, wherein an extension of at least one of the holding surfaces in the direction (x) is adjustable.

20. The bottomer according to claim 1, wherein the bottomer is configured to produce cross-bottom valve sacks.

21. A glue unit for applying glue to sack components, comprising:
   a nozzle bar having at least one nozzle for extruding a glue onto the sack components; and
   a counter support that positions the sack components with a force against the nozzle bar, the counter support including a segmented active surface that applies force to at least one part of a rear side of the sack component surface to which the glue is being applied, the segmented active surface including partial areas that can transmit the force independently of each other.

* * * * *